June 4, 1929.  H. McFARLANE  1,716,073
DIFFERENTIAL GEARING FOR FOUR-WHEEL DRIVE CONSTRUCTIONS
Filed April 23, 1928
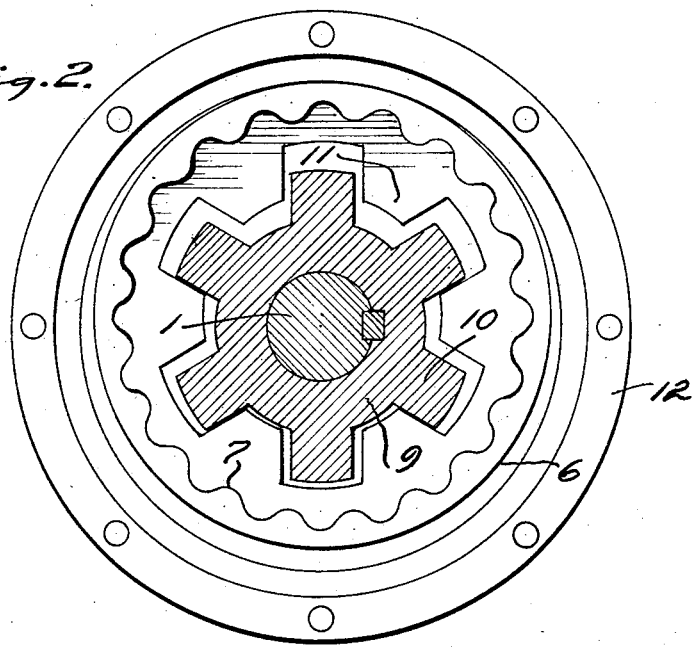
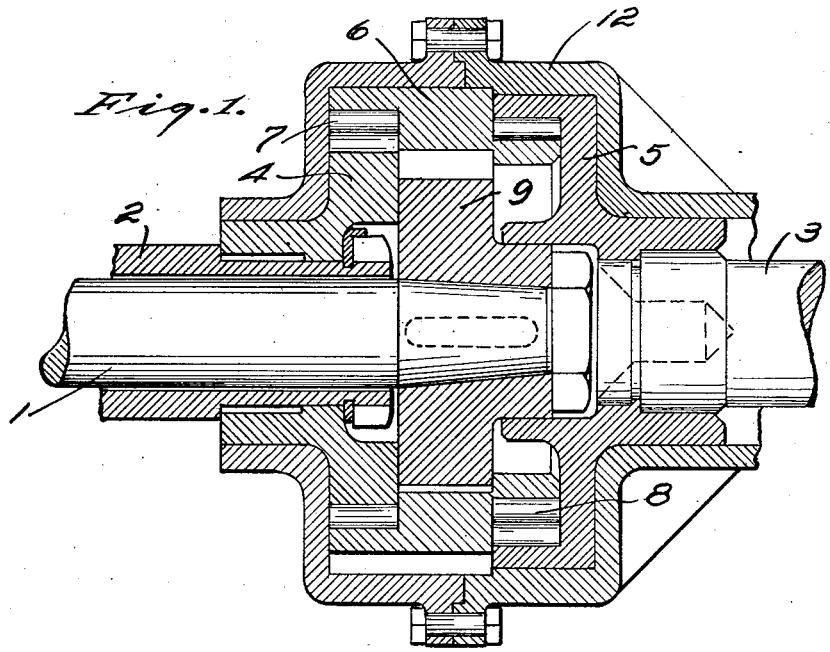
Inventor,
Hugh McFarlane
Rummler & Rummler
Attorneys.

Patented June 4, 1929.

1,716,073

UNITED STATES PATENT OFFICE.

HUGH McFARLANE, OF SCOTTSVILLE, VIRGINIA.

DIFFERENTIAL GEARING FOR FOUR-WHEEL-DRIVE CONSTRUCTIONS.

Application filed April 23, 1928. Serial No. 272,109.

This invention relates to differential gearing for automobiles and of the type described in the patent to John Krohn No. 1,483,606 of February 12, 1924. The purpose of the invention is to render said gearing useful in a coaxial arrangement of the drive and driven shafts and to obviate the use of a ring gear and pinion for driving the same. Another object of the invention is to slightly increase the resistance to differential action of said gearing and adapt it for use as the third differential in a four-wheel drive arrangement.

In the drawings illustrating the construction,

Fig. 1 is a view of the gearing in longitudinal section.

Fig. 2 is a transverse view, partly in section and with one side of the casing omitted.

In a four-wheel driving construction, a third differential is desirable between the two pairs of driven axles, even though the required degree of differential action is small. When there is a requirement for differential action between two pairs of axles as for example, when one tire is inflated more or less than the remaining three tires. the propeller shaft for one pair of axles should be permitted to have a rate of rotation differing from the rate of the propeller shaft for the remaining pair of driven axles. This is clear from the fact that the peripheral speeds of tires must be such that no tire is forced to slip. The angular speeds of the wheels accordingly must vary. The propeller shaft for each pair of wheels or axles runs according to the average speed of its pair; and since such speed is not exactly the same for one pair of axles as for the other pair, a differential gearing is desirable for driving the two propeller shafts of a four-wheel drive arrangement. Where two or more axle differentials are geared directly to a single propeller shaft, tire slip results, and if the load is great, there is an excessive strain on the propeller shaft.

Road conditions generally result in more or less differential action taking place continually when provision is made for such differential action, and in turning, in the case of a four-wheel drive construction, unless the driving wheels track, the turning radii of the two pairs of axles will be different and the axle driving members must have different speeds in order to avoid excessive mechanical strains and slip of the tires.

The standard type of bevel gear differential has a very free differential action and is therefore unsatisfactory under such conditions where one of the wheels has poorer traction than the others and is free to spin. The differential gearing described in the above patent to John Krohn is designed to overcome the difficulty with the standard bevel gear type of differential by offering greater resistance to differential action under normal conditions and very much greater resistance to high speed differential action, as would be the case where one wheel is free to slip at a rapid rate.

In all differential mechanisms, the driving member drives each wheel by using the opposing wheel plus the internal resistance of the differential unit as a fulcrum. Thus the added resistance in the Krohn differential gearing results in said gearing functioning in the desired manner. For example, where there is considerable difference in the road traction between a pair of driven wheels, the Krohn differential gearing adds resistance to that of the slipping wheel to balance the available traction under the pulling wheel and thus allows it to make use of its entire pulling ability.

The purpose of the present invention is to make the Krohn differential gearing available for a simple arrangement of driving means in four-wheel drive constructions. That is, in cases where it is desirable to avoid the use of a ring gear and pinion for driving the differential so that the drive shaft and the two driven shafts may be in coaxial alinement.

In the improved construction, as shown in the drawings, the main drive shaft 1 is arranged for driving a pair of propeller shafts 2 and 3 which, in a four-wheel drive construction, each serve to drive the differential for one pair of the drive axles and may for this purpose each carry a pinion or worm for driving the ring gear of a differential gearing. In order that all shafts may be arranged coaxially, the driven shaft 2 is in the form of a tube surrounding shaft 1. The driven shaft 2 has secured thereto at its inner end an external gear 4 and the driven shaft 3 has secured to its inner end an internal gear 5.

These gears respectively mesh with a central internal-external gear 6. The gear 6 is eccentrically supported on the gears 4 and 5 and has the set of internal teeth 7 for meshing with the gear 4 and the external teeth 8 for meshing with the internal gear 5. The number of teeth 7 are preferably by one greater than the number of teeth in the gear 4 and the number of teeth 8 are one less than the teeth in the gear 5. When gear 6 turns upon its axis, it will normally drive gears 4 and 5 at the same rate but gear 6 may also move in a circular path without turning upon its axis.

In order to rotate the gear 6 and thus drive the shafts 2 and 3, a driving connection 9 is provided between the shaft 1 and the gear 6. The driving connection 9 is keyed to shaft 1 and is provided with a plurality of lugs 10 for coacting with inwardly extending lugs or teeth 11 on the gear 6. This arrangement of the driving connection, as will be seen from the clearance provided between the lugs 10 and 11, permits the gear 6 to have a bodily circular motion with respect to the driving member 9, while not permitting any independent angular motion between the driving member and the gear. The elements of the differential gearing are rotatable within a casing 12 which may be either fixed or free to rotate.

In the operation of the improved differential gear, rotation of shaft 1 causes the gear 6 to rotate with it and normally drives the shafts 2 and 3 at the same rate as shaft 1. If one of the driven shafts is retarded by carrying a greater load than the other driven shaft, the gear 6, while it rotates at the same rate as shaft 1, is also compelled to move in a circular path around or in the retarded gear 4 or 5 according to the decreased speed of the retarded shaft and thus, through its gear connection with the remaining shaft, cause the remaining shaft to speed up over the normal rate of the driving shaft 1. Drive shaft 1 rotates approximately at the average speed of the two driven shafts.

The improved differential gearing provides a high resistance to differential action but is responsive to allow a slight difference in speed of the driven shafts and accordingly saves them from needless strain.

Although but one specific embodiment of this invention has been herein shown and described, it will be understood that details of the construction shown may be altered or omitted without departing from the spirit of this invention as defined by the following claims.

I claim:

1. A differential gearing of the class described, comprising a drive shaft, a gear having internal and external teeth, a driving connection between said gear and drive shaft, said driving connection being secured to the shaft and having radial lugs which engage and compel the gear to turn with the shaft at the same rate but is arranged to permit a free circular motion of the gear, a pair of driven shafts, one of which carries an internal gear and the other an external gear, and said internal and external gears meshing with said first-mentioned gear.

2. A differential gearing of the class described, comprising a drive shaft, a pair of driven shafts coaxial therewith, an internal gear fast to one of said driven shafts and an external gear fast to the other driven shaft, and an eccentric internal-external gear mounted for rotation with said drive shaft and meshing with each of the gears on said driven shafts.

Signed at Scottsville this 9th day of April, 1928.

HUGH McFARLANE.